United States Patent [19]
Argade

[11] Patent Number: 5,983,284
[45] Date of Patent: Nov. 9, 1999

[54] TWO-BUTTON PROTOCOL FOR GENERATING FUNCTION AND INSTRUCTION MESSAGES FOR OPERATING MULTI-FUNCTION DEVICES

[75] Inventor: Pramod V. Argade, Allentown, Pa.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,879

[22] Filed: Jan. 10, 1997

[51] Int. Cl.[6] ............................ G06F 13/00; G06F 17/00; G10L 3/00
[52] U.S. Cl. ......................... 710/1; 704/270; 364/400.01
[58] Field of Search ..................................... 704/270, 271, 704/272, 273, 274, 275; 364/400.01, 709.16, 710.07, 710.12; 369/19, 20, 21, 22, 23, 30, 31, 32, 33, 34, 69, 70, 63, 64, 65, 66; 395/821; 345/978; 708/146, 167, 172; 710/1

[56] References Cited

U.S. PATENT DOCUMENTS

| | | | |
|---|---|---|---|
| Re. 34,800 | 11/1994 | Hutchins | 128/898 |
| 3,983,553 | 9/1976 | Kesling | 341/27 |
| 4,085,446 | 4/1978 | Nagamura | 711/117 |
| 4,303,395 | 12/1981 | Bower | 434/226 |
| 4,489,436 | 12/1984 | Yoshimura et al. | 704/270 |
| 4,891,660 | 1/1990 | Biondo, Jr. | 396/283 |
| 4,992,972 | 2/1991 | Brooks et al. | 235/379 |
| 5,145,447 | 9/1992 | Goldfarb | 446/408 |
| 5,187,797 | 2/1943 | Nielsen et al. | 345/338 |
| 5,210,520 | 5/1993 | Housley | 340/326 |
| 5,223,828 | 6/1993 | McKiel, Jr. | 340/825.19 |
| 5,245,694 | 9/1993 | Zwern | 704/200 |
| 5,261,042 | 11/1993 | Brandt | 345/333 |
| 5,412,189 | 5/1995 | Cragun | 235/379 |
| 5,460,228 | 10/1995 | Butler | 169/30 |
| 5,463,369 | 10/1995 | Lamping | 340/384.7 |
| 5,483,577 | 1/1996 | Gulick | 379/67 |
| 5,511,000 | 4/1996 | Kaloi et al. | 704/201 |
| 5,521,812 | 5/1996 | Feder et al. | 364/400 |
| 5,548,272 | 8/1996 | Clark | 340/407.1 |
| 5,588,839 | 12/1996 | Shimoda | 434/114 |
| 5,631,745 | 5/1997 | Wong et al. | 364/468.15 |
| 5,657,380 | 8/1997 | Mozer | 379/88.01 |
| 5,698,834 | 12/1997 | Worthington et al. | 235/472 |
| 5,757,279 | 5/1998 | Fujiwara | 340/825.44 |
| 5,786,819 | 6/1998 | Weiser et al. | 345/354 |
| 5,872,521 | 2/1999 | Lopatukin et al. | 340/825.44 |
| 5,877,744 | 3/1999 | Gaskill | 345/146 |

*Primary Examiner*—Zarni Maung
*Assistant Examiner*—Andrew Caldwell

[57] ABSTRACT

A multi-function device has a user interface with two buttons that are operated using a two-button protocol to generate function messages and instruction messages. Each function message identifies or describes one of the different functions of the device, while each instruction message corresponds to one of the instruction steps for one of the device functions. The user interface generates signals to control presentation of the function and instruction messages. The device also has a message processor that generates the function and instruction messages based on the signals from the user interface as well as a message rendering component to render the function and instruction messages. In one embodiment, the various function and instruction messages are audio messages and the message rendering component is a speaker, although other, nonvisual messages could be used instead. The message processor may be implemented as part of a single chip processor that has an input-output component, a data memory component, and a central processing unit. In addition to instruction and function messages, the two-button user interface can be used to generate troubleshooting messages.

50 Claims, 3 Drawing Sheets

FIG. 4

TWO-BUTTON PROTOCOL FOR GENERATING FUNCTION AND INSTRUCTION MESSAGES FOR OPERATING MULTI-FUNCTION DEVICES

BACKGROUND OF THE INVENTION

1. Field of the Invention

The present invention relates to a technology for providing instructions for the operation of multi-function devices, such as appliances and other equipment.

2. Description of the Related Art

Modern homes, offices, factories, and laboratories are full of high-tech appliances and equipment, most of which are used without formal training. In spite of attempts to make them easy to use, common experience is that many of these devices are indeed hard to use, with difficulty of programming a video cassette recorder (VCR) being a frequently cited example. Many users lack the patience to figure out the instructions from written manuals provided with the devices and, in many cases, the manuals cannot be found even if the user is desperate enough to read through and follow the written instructions. This often results in less than complete utilization of the features of the device, loss of use with a minor breakdown, or simply being unable to proceed with the operation of the device.

Users want devices that are high-tech in content but low-tech in ease of use. In spite of attempts to make user interfaces intuitive, most of them are not intuitive at all and some are indeed very hard to use. Providing a simple user interface is complicated by a very large and diverse customer base as well as by price constraints.

In order to get around this problem, some devices offer other means for making it easy to use a device. For example, VCR's offer features such as on-screen programming, although one still has to read a manual to become familiar with how to use it. Some devices, such as photocopy machines, offer a liquid crystal display (LCD) and an "i" button to get information on use or trouble-shooting. Nevertheless, it is not economical to provide an LCD display to provide visual help instructions on all devices.

SUMMARY OF THE INVENTION

The present invention is directed to improved technology for providing instructions for the operation of multi-function devices, such as appliances and other equipment.

In an exemplary embodiment, the present invention is directed to an apparatus for providing instructions to operate a device. The apparatus is adapted to present one or more function messages identifying one or more device functions and to present one or more instruction messages for each of the device functions. The apparatus comprises (a) a user interface adapted to generate signals to control playing of the function and instruction messages; (b) a message processor adapted to generate the function and instruction messages based on the signals from the user interface; and (c) a message rendering component adapted to render the function and instruction messages.

In another exemplary embodiment, the present invention is directed to an apparatus for providing instruction to a user to assist the user in operating a multi-function device, where the apparatus has processing capability and memory. The apparatus comprises (a) function messages describing to the user, functions that are supported by the multi-function device and (b) instruction messages instructing the user how to operate the multi-function device, wherein the multi-function device performs at least one task associated with at least one of the functions. Both the function messages and the instruction messages are adapted to be stored in memory. The apparatus also comprises a toggle mechanism, having a first button associated with the function messages and a second button associated with the instruction messages, where the toggle mechanism is configured to enable the user to quickly select a particular function message and an associated instruction message by toggling and/or holding the first and/or second buttons relative to each other.

In yet another exemplary embodiment, the present invention is directed to a processor for use in an apparatus that provides instructions to operate a multi-function device. The processor comprises (a) an input/output component adapted to receive signals from a user interface instructing the processor to present function messages and instruction messages, where each function message corresponds to a function of the multi-function device and each instruction message corresponds to an instruction step for one of the device functions; (b) a data memory component adapted to store compressed data corresponding to the function and instruction messages; and (c) a central processing unit (CPU) adapted to decompress the compressed data to generate decompressed data corresponding to the function and instruction messages.

Further aspects and advantages of this invention will become apparent from the detailed description which follows.

DETAILED DESCRIPTION

According to certain embodiments of the present invention, a general purpose protocol is provided for a user to get instructions (e.g., audio instructions) for operating a particular device. The user manipulates a user interface having two buttons (i.e., a "function" button and an "instruction" button). This protocol allows the user to select quickly the device function for which he/she needs instructions, and then to step through the instructions for that selected function step by step at the user's own pace. There is also a provision for troubleshooting on a per instruction basis. Embodiments of the present invention can be used to provide help capability on a wide range of devices.

Figure 1:
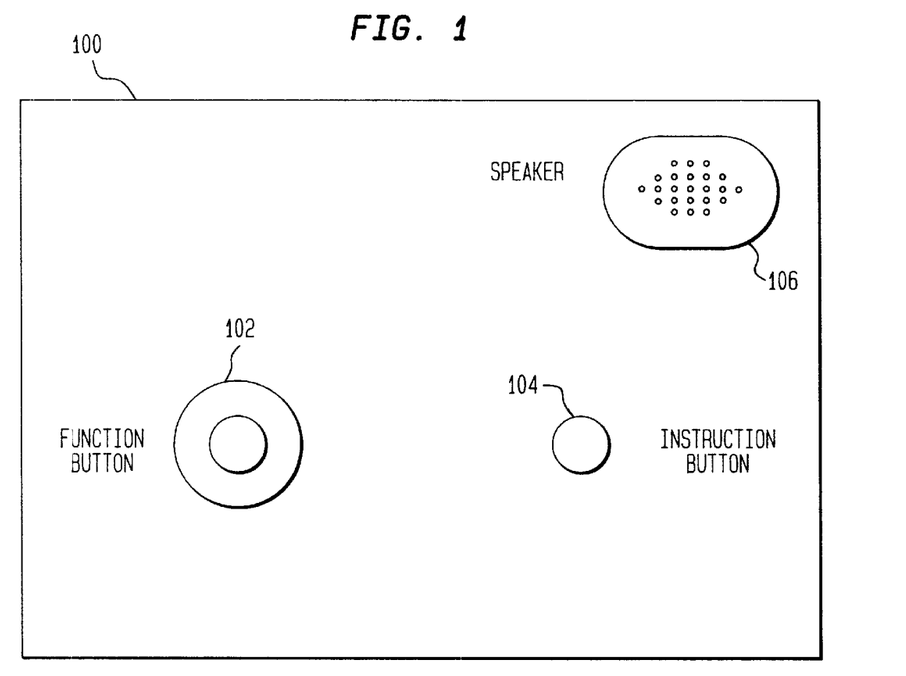
FIG. 1 represents the user interface of an audio instruction device (AID), according to one embodiment of the present invention.
Figure 2:
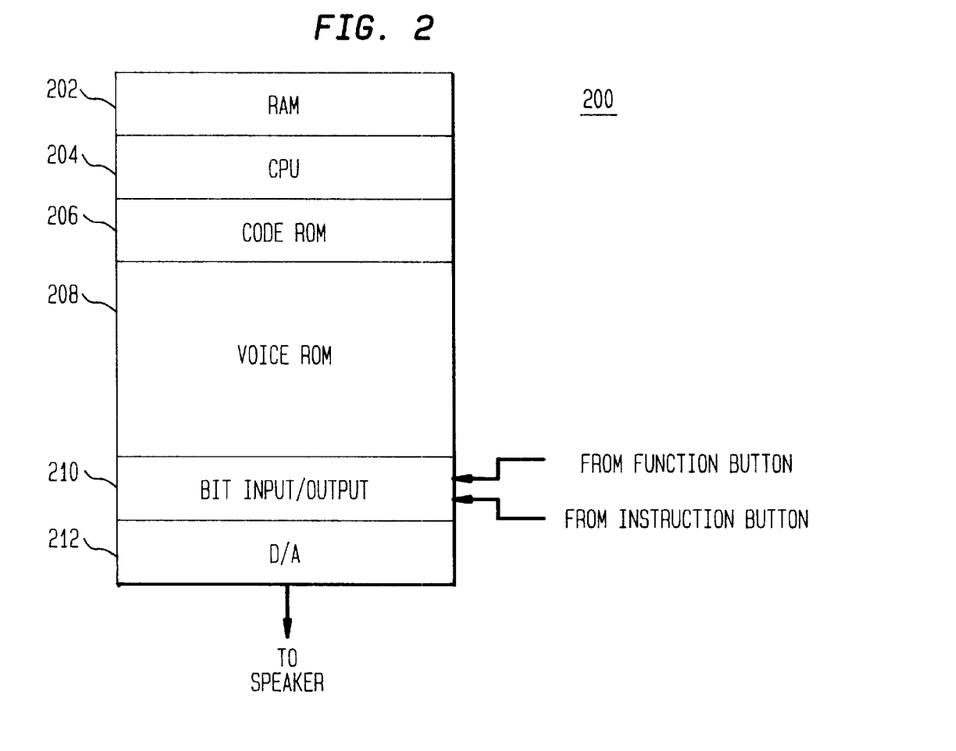
FIG. 2 represents the computer chip used to implement an AID, according to one embodiment of the present invention.

FIGS. 1 and 2 represent components of an audio instruction device (AID), according to one such embodiment of the present invention. FIG. 1 is a schematic diagram of the front face of a user interface 100 for the AID and FIG. 2 is a block diagram of a computer chip 200 used to implement the AID. User interface 100 has function button 102, instruction button 104, and a loudspeaker 106. Computer chip 200 receives signals from function and instruction buttons 102 and 104 and generates audio signals for rendering by speaker 106.

As shown in FIG. 2, computer chip 200 has random access memory (RAM) 202, central processing unit (CPU) 204, code read-only memory (ROM) 206, voice ROM 208, bit input/output (I/O) 210, and digital-to-analog (D/A) converter 212. Code ROM 206 stores a voice decoder algorithm and voice ROM 208 stores encoded voice data. Bit I/O 210 receives signals from function and instruction buttons 102 and 104 of FIG. 1. CPU 204 selects different sets of encoded voice data stored in voice ROM 208 for decoding based on the button signals received by bit I/O 210 from user interface 100. CPU 204 implements the voice decoder algorithm stored in code ROM 206 (using RAM 202 as needed for temporary storage) to decode the selected sets of encoded voice data stored in voice ROM 208. D/A converter 212 converts the decoded voice data to analog audio signals for transmission to and rendering by speaker 106 of FIG. 1.

In one embodiment, the AID relies on the following protocol to select and play the instructions for any one of a plurality of functions supported by a particular device, where "F" represents the function button and "I" represents the instruction button:

| | |
|---|---|
| o Toggle F: | Go to next function; |
| o Hold I and toggle F: | Go to previous function; |
| o Toggle I: | Go to next instruction for current function; |
| o Hold F and toggle I: | Go to previous instruction for current function; |
| o Hold F and hold I: | Trouble-shooting help for current function; and |
| o Hold F and hold I (two times): | Reset the AID. |

Whenever the next/previous function/instruction is selected, the computer chip 200 processes the appropriate sets of encoded voice data to play the corresponding audio message on speaker 106. In this embodiment, the corresponding audio message is always one function message or one instruction message. A function message is the name or brief description of one of the functions supported by the device. An instruction message is one instruction step of the possibly multiple instruction steps involved in implementing one of the device functions.

Figure 3:
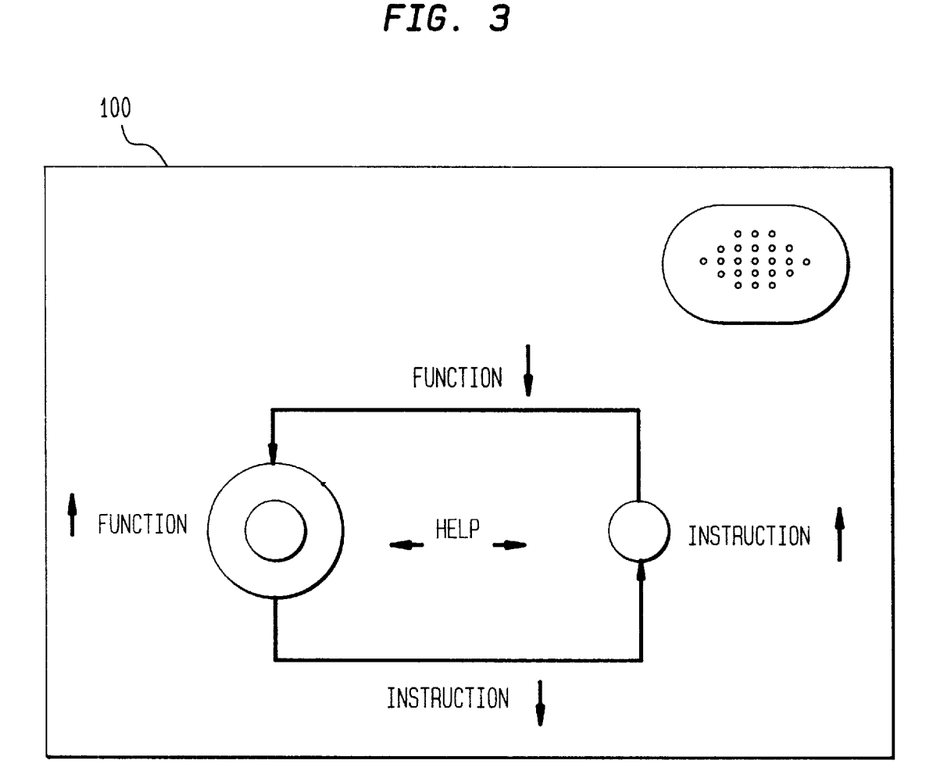
FIG. 3 shows a self-explanatory implementation of the user interface of FIG. 1.

FIG. 3 shows a self-explanatory implementation of the user interface of FIG. 1. In practice, the user would manipulate user interface 100 (e.g., by toggling the function button) to cycle through the device functions until the desired function is reached. The user would then manipulate user interface 100 (e.g., by toggling the instruction button) to step through the individual instruction steps one by one for the current function (i.e., the function corresponding to the most recently played function message). Previous function/instruction messages can be played by holding one button and toggling the other. Special trouble-shooting instructions for the current function and/or instruction can be played by holding both buttons.

Figure 4:
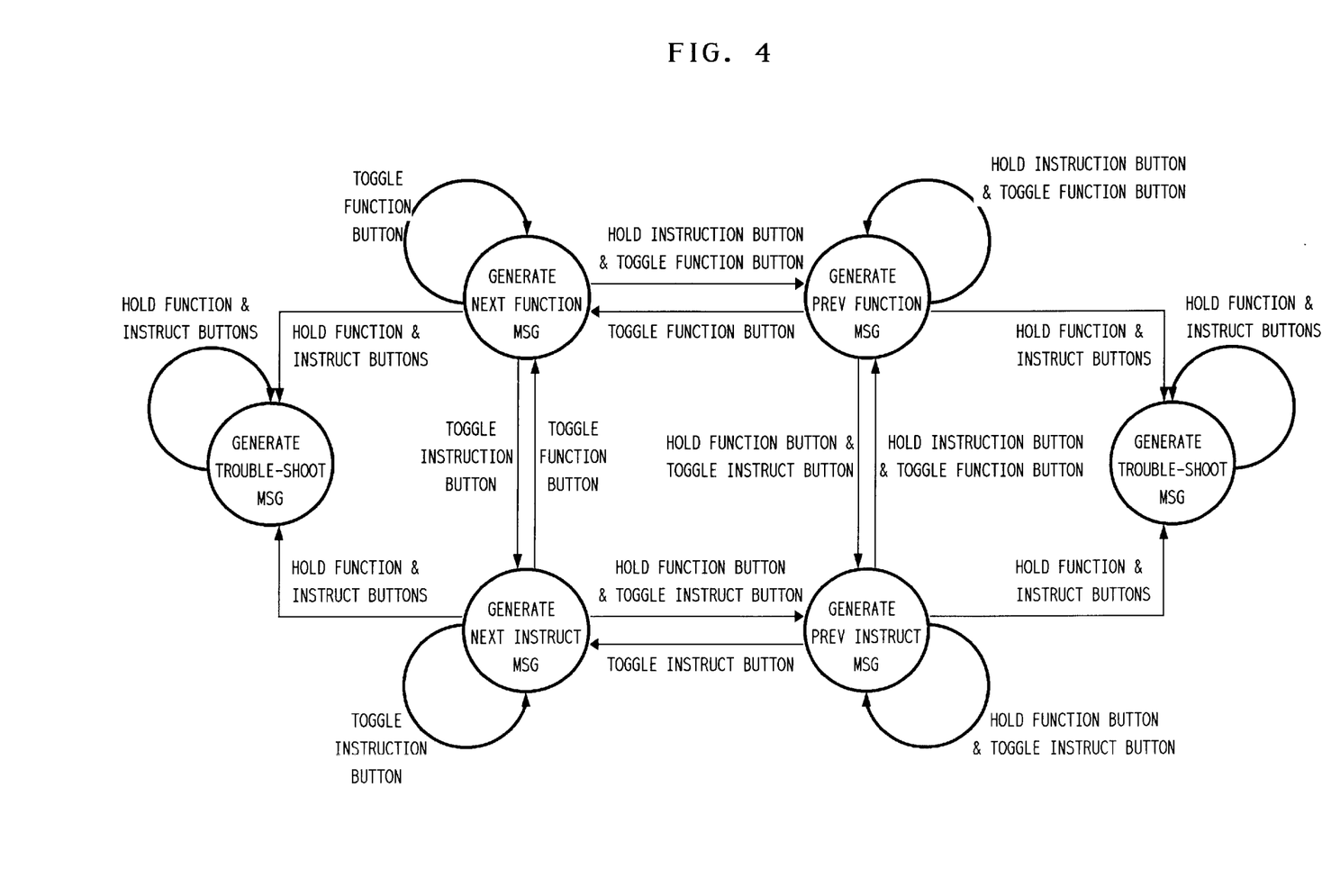
FIG. 4 shows a state diagram representing the five message functions that can be implemented by operating the function and instruction buttons of the user interface of FIG. 1.

FIG. 4 shows a state diagram representing the five message functions that can be implemented by operating the function and instruction buttons of the user interface of FIG. 1. In a preferred embodiment, each of the five message-function states can be reached from any other state by operating the appropriate buttons.

In one implementation, when the device is first plugged into a power supply, the AID plays a greeting as well as basic instructions on how to use either the AID or the device or both, including any precautions. This greeting could be turned off by resetting the AID (e.g., by simultaneously holding F and I twice in a row).

After this power-up message, the AID would enter a standby mode and remain silent until one or both buttons are manipulated. In power sensitive applications, this standby mode may imply a wait-for interrupt mode for the processor. A toggling of the button(s) would generate an interrupt to the processor to put it in the active mode.

Whether the AID is fully driven by the user or whether it enters the reset state after a preset interval of inactivity may be implementation dependent. The AID may be implemented such that the user does not have to wait for the AID to play a complete function/instruction. In such an implementation, the user action (e.g., play next function message) would be serviced immediately after it is entered (e.g., before the previous message was completed).

A user plays audio instructions using the F and I buttons. For example, functions in a VCR are: setting clock, one-touch recording, programming to record at a later time, setting channels, etc. The instructions for each function correspond to the various device-button sequences required to implement that function. In order to get instructions for using one of the above VCR functions, the user would toggle the F button. For every toggling of the F button, the user would hear another function message identifying another function of the device. The user would keep toggling the F button until he/she hears the function of interest. If the user overshoots the function of interest, the user can back up by holding the I button and toggling the F button.

When the user stops toggling the F button, the function last heard is selected for getting instructions. At this point, every time the I button is toggled, the user would hear the next instruction to follow for the currently selected function. The user can step through the instructions at his/her own pace and also go back to the previous instruction by holding the F button and toggling the I button.

The two-button AID protocol can be extended to provide troubleshooting instructions. For example, an audio instruction may ask for the user to do a particular step and check for a particular result. If the result is not observed, the user could enter the troubleshooting mode by simultaneously holding down the F and I buttons. At this point, the AID could provide a single troubleshooting message. In an alternative embodiment, the user could navigate through step-by-step debugging instructions by toggling the I button.

Since the instructions needed after first plugging in the device may be different from those needed for subsequent routine usage, another feature of the AID could be to rearrange the order in which the functions are played based on their frequency of usage. For example, at a subway ticket vending machine, the function button may be used to select a language. The sequence of playing the language choice could be set by default on power up by the subway operator. If tourists speaking a particular language happen to use the vending machine frequently on a particular day, that language choice could be elevated in order of presentation to users.

The AID could also be designed to play the function messages based on the recentness of selection with the most recently selected function played first and the least recently selected function played last. For example, in a VCR, the AID could be designed to play first the function message for setting the clock after initial power-up. From then on, the AID could play function messages based on when the corresponding functions were most recently selected. In this way, the user would not have to toggle past the clock-setting function every time the AID was used.

The present invention provides certain advantages over the prior art. Audio step-by-step instructions are provided at the user's own pace. Audio instructions can be provided in prerecorded human voice and are always available without the need for separate written instructions. There is no need for the user to remember complex button sequences. Instructions could be offered in many languages: one function could be used to select a language for subsequent functions. The invention can track the frequency/order of function selection and rearrange accordingly the sequence in which the functions are presented.

A VCR is one type of device for which an audio instruction device according to the present invention would be particularly useful. In one possible implementation, toggling the function (F) button on the VCR AID repeatedly would play the following sequence of function messages, one at a time:

"Overview of VCR controls."
"Setting clock."
"Playing a cassette."
"One touch programming."
"Programming for unattended recording."
"Programming controls."

Once all of the function messages are played, toggling F would return to the first function message.

After the desired function message is played, toggling the instruction (I) button once selects that function and plays the first instruction message for the selected function. Each time the I button is toggled the next instruction message for the currently selected function is played. For example, for the "Setting clock" function, the sequence of instruction messages could be as follows:

"Turn power on."
"Toggle Select. Day flashes."
"Use Set to enter day."
"Toggle Select. Hour flashes."
"Use Set to enter hour."
"Toggle Select. Minute flashes."
"Use Set to enter minute. Hold Set down to rapidly increment minute."
"Toggle Return to complete."

Holding both the F and I buttons and releasing could provide trouble-shooting. For example, selecting trouble-shooting after the second step to find out why the day is not flashing, the AID could play a trouble-shooting message for that step, such as "Make sure the VCR power is turned on." Toggling the I button would then continue to the next instruction message. Holding both the F and I buttons down and then releasing, two times in a row, would reset the AID to the beginning of the function list.

The AID can be realized in different implementation scenarios. In one scenario, the AID provides a relatively small instruction set for a high volume but price sensitive market (e.g., the consumer market). In this case, it may be preferable to provide a single-chip AID solution as in FIG. 2, where the compressed voice data are stored in the AID chip and selected portions are decompressed and played to the user.

In another scenario, the instruction set is too large to be implemented with a single AID chip. In this case, the compressed voice data may be stored on a separate memory chip. In alternative embodiments, the instructions may be stored as text and a text-to-speech (TTS) program may be used to play instructions to the user.

When the instruction set is fixed and relatively small, the most economical way to realize the AID may be to store compressed speech in a ROM for decompression and playback on user demand. Presently, TTS algorithms require a minimum of 1 MByte storage for the program, including storage for voice inventory tables. Furthermore, additional space would be needed for storing the text. Moreover, the voice would be synthesized and hence would not sound natural. For these reasons, TTS may not be practical for low-cost applications. Storing compressed voice data is practical and has the added advantage of offering instructions in natural human voice.

Referring again to FIG. 2, in one implementation, CPU 204 would be used primarily to decode voice compressed using a voice coding algorithm, such as one of the linear prediction algorithms, for example, residual excited linear prediction (RELP) or adaptive differential pulse code modulation (ADPCM). CPU 204 also manages user interface 100 of FIG. 1.

Bit I/O 210 is responsible for interfacing to the two buttons, F and I, of user interface 100. Each line into bit I/O 210 is an input lines and should be capable of generating an interrupt to wake CPU 204 from its wait-for-interrupt standby mode. D/A converter 212 corresponds to the D/A converter of a conventional audio codec.

A major part of the software for the AID chip is the voice decoder (stored in code ROM 206). The voice decoder is encapsulated in a control loop that takes input from the two user buttons (F and I) and plays the corresponding words.

In order to achieve efficient memory use and thereby reduce the size requirements for voice ROM 208, each unique word in the different function and instruction messages may be represented by a single instance of compressed audio data in voice ROM 208. For example, in the VCR messages described earlier in this specification, the word "select" appears in three different instruction messages of the clock setting function. "Select" may also occur in other instruction messages of other VCR functions and/or in other VCR function messages themselves. According to certain embodiments of the present invention, the compressed audio data corresponding to the word "select" is stored once in voice ROM 208. Code ROM 206 stores pointers that identify the locations of the compressed audio data corresponding to the appropriate words of the different function and instruction messages. CPU 204 uses those pointers to retrieve the appropriate instances of compressed audio data from voice ROM 208 to generate the various audio function and instruction messages.

Voice decoders are tolerant to bit errors in the input. Furthermore, the human ear can also tolerate a reasonable amount of error. In order to enhance effective chip yields, the ROM contents may be separated into two parts: defect tolerant ROM (DTROM) and defect intolerant ROM (DIROM). DIROM would contain the voice decoder kernel and the control loop for the user interface. It would also contain pointers to voice ROM 208 for constituent words of the function and instruction messages. For one possible implementation, a worst case estimate for the ROM size for these pointers is 512 bytes (16-bit pointers for 256 words). DTROM would contain primarily voice ROM 208. The spoken words could be stored on byte boundaries so as to pack them without any gaps. This would require 16-bit pointers to the words as assumed above, which can be stored in 512 bytes in DIROM For testing, a test program could be set up to ensure that DIROM is error free and that any errors in DTROM do not exceed a given tolerance. Such test programs can be part of a yield improvement program for the AID chips.

One advantage of the AID chip of FIG. 2 is that customizing it would involve minimal non-recurring expense (NRE). This is because, customizing the AID chip would mean reprogramming the DTROM as well as the pointer portion of the DIROM. A procedure could be set up for an original equipment manufacturer (OEM) to provide the audio words corresponding to the function and instruction messages on a suitable medium. This audio input would then be compressed and a pointer table for the DIROM would be created. The reprogramming of the DTROM and DIROM could be completely automated once an OEM provides the audio instruction data. This would make NRE for customization minimal.

Those skilled in the art will understand that the particular two-button protocol shown in FIG. 3 is one possible implementation of the present invention. Other protocols, some of which may rely on other than two buttons, may also be within the scope of the present invention. Moreover, embodiments of the user interface other than user interface 100 may be within the scope of the present invention. For example, the user interface could be a computer mouse where the two-button protocol could be implemented using the left and right mouse buttons. Alternatively, the user interface could be implemented as a graphical user interface displayed on a computer monitor to present the user with protocol options.

In the detailed embodiments described in conjunction with FIGS. 1–3, the function and instruction messages are audio messages rendered on a loudspeaker. In alternative embodiments, the function and/or instruction messages may be other than audio messages, such as visual messages or even tactile (e.g., Braille) messages. In these embodiments, the message rendering component may be a visual display, such as a computer monitor or a liquid crystal display, or an appropriate tactile interface, rather than a loudspeaker. The information in the visual messages may be conveyed to a user using text or symbols or both. In still other embodiments, both audio, visual, and/or tactile messages may be presented to the user at the same time. Audio and tactile messages are types of non-visual messages.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A processor for use in an apparatus that provides instructions to operate a multi-function device, the processor comprising:

(a) an input/output component adapted to receive signals from a user interface instructing the processor to generate non-visual function messages and non-visual instruction messages, each function message corresponding to a function of the multi-function device and each instruction message corresponding to an instruction step for one of the device functions;

(b) a data memory component adapted to store compressed data corresponding to the function and instruction messages; and (c) a CPU adapted to decompress the compressed data to generate decompressed data corresponding to the function and instruction messages;

wherein the input/output component is adapted to receive signals from a user interface comprising:
   a single function button and an instruction button;
   the function button is operated to cause the message processor to generate function messages; and
   the instruction button is operated to cause the message processor to generate instruction messages for the device function corresponding to the most recently generated function message.

2. The invention of claim 1, wherein the signals received from the user interface comprise:

(1) a first set of one or more signals that causes the message processor to generate a next function message;

(2) a second set of one or more signals that causes the message processor to generate a next instruction message for a selected device function;

(3) a third set of one or more signals that causes the message processor to generate a previous function message;

(4) a fourth set of one or more signals that causes the message processor to generate a previous instruction message for the selected device function; and (5) a fifth set of one or more signals that causes the message processor to generate one or more troubleshooting messages.

3. The invention of claim 2, wherein:
   the first set of signals is generated by toggling the function button of the user interface;
   the second set of signals is generated by toggling the instruction button of the user interface;
   the third set of signals is generated by holding the instruction button and then toggling the function button;
   the fourth set of signals is generated by holding the function button and then toggling the instruction button; and
   the fifth set of signals is generated by holding both the function and instruction buttons.

4. The invention of claim 1, wherein the function and instruction messages are audio messages.

5. The invention of claim 1, wherein the function messages are adapted to be generated in a particular order selected based on prior user selections of the device functions.

6. The invention of claim 1, wherein:
   at least two of the function and instruction messages have at least one word in common;
   the data memory component stores a single instance of data for the common word; and
   the single instance is adapted to be processed to generate the common word for each of the at least two function and instruction messages.

7. The invention of claim 1, wherein the user interface comprises the single function button and a single instruction button.

8. The invention of claim 1, wherein the user interface consists of the single function button and a single instruction button.

9. The invention of claim 1, wherein the function and instruction buttons are selectively operated to generate either a next function message, a previous function message, a next instruction message for a selected device function, or a previous instruction message for the selected device function.

10. An apparatus for providing instructions to operate a device, wherein:
   the apparatus is adapted to present one or more function messages identifying one or more device functions;
   the apparatus is adapted to present one or more instruction messages for each of the device functions;
   the function and instruction messages are non-visual messages; and
   the apparatus comprises:

(a) a user interface adapted to generate signals to control presentation of the function and instruction messages;

(b) a message processor adapted to generate the function and instruction messages based on the signals from the user interface; and (c) a message rendering component adapted to render the function and instruction messages;

the user interface comprises a single function button and an instruction button;

the function button is operated to cause the message processor to generate function messages; and the instruction button is operated to cause the message processor to generate instruction messages for the device function corresponding to the function message most recently rendered by the message rendering component.

11. The invention of claim 10, wherein the signals comprise:

(1) a first set of one or more signals that causes the message processor to generate a next function message; and (2) a second set of one or more signals that causes the message processor to generate a next instruction message for a selected device function.

12. The invention of claim 11, wherein the signals further comprise:

(3) a third set of one or more signals that causes the message processor to generate a previous function message; and (4) a fourth set of one or more signals that causes the message processor to generate a previous instruction message for the selected device function.

13. The invention of claim 12, wherein the signals further comprise:

(5) a fifth set of one or more signals that causes the message processor to generate one or more trouble-shooting messages.

14. The invention of claim 10, wherein:

(1) operating the function button generates a first set of one or more signals that causes the message processor to generate a next function message; and (2) operating the instruction button generates a second set of one or more signals that causes the message processor to generate a next instruction message for a selected device function.

15. The invention of claim 14, wherein:

(3) operating first the instruction button and then the function button generates a third set of one or more signals that causes the message processor to generate a previous function message; and (4) operating first the function button and then the instruction button generates a fourth set of one or more signals that causes the message processor to generate a previous instruction message for the selected device function.

16. The invention of claim 15, wherein:

(5) simultaneously operating the function button and the instruction button generates a fifth set of one or more signals that causes the message processor to generate one or more trouble-shooting messages.

17. The invention of claim 10, wherein the message processor is adapted to generate the function messages in a particular order selected based on prior user selections of the device functions.

18. The invention of claim 17, wherein the first function message in the particular order corresponds to the most recently selected device function.

19. The invention of claim 17, wherein the particular order is based on frequency of the prior user selections of the device functions.

20. The invention of claim 10, wherein the message processor is adapted to generate one function message or one instruction message for each set of signals generated by the user interface.

21. The invention of claim 10, wherein the message processor comprises:

(1) memory adapted to store data corresponding to the function and instruction messages; and (2) a data processor adapted to process the stored data to generate the function and instruction messages.

22. The invention of claim 21, wherein:

at least two of the function and instruction messages have at least one word in common;

the memory stores a single instance of data for the common word; and the data processor is adapted to process the single instance to generate the common word for each of the at least two function and instruction messages.

23. The invention of claim 10, wherein the function and instruction messages are audio messages.

24. The invention of claim 10, wherein:

the function and instruction messages are audio messages, wherein:

(1) toggling the function button generates a signal that causes the message processor to generate a next audio function message;

(2) toggling the instruction button generates a signal that causes the message processor to generate a next audio instruction message for a selected device function;

(3) holding the instruction button and then toggling the function button generate signals that cause the message processor to generate a previous audio function message;

(4) holding the function button and then toggling the instruction button generate signals that cause the message processor to generate a previous audio instruction message for the selected device function; and (5) holding both the function and instruction buttons generates signals that cause the message processor to generate one or more trouble-shooting messages;

the message processor is adapted to generate the audio function messages in a particular order selected based on prior user selections of the device functions;

the message processor is adapted to generate one audio function message or one audio instruction message for each set of signals generated by the user interface;

the message processor comprises:

(1) an input/output component adapted to receive the signals from the function and instruction buttons of the user interface;

(2) a voice memory component adapted to store compressed audio data corresponding to the audio function and instruction messages;

(3) a central processing unit (CPU) adapted to decompress the compressed audio data to generate decompressed audio data; and (4) a digital-to-analog converter adapted to convert the decompressed audio data into analog audio function and instruction messages for rendering by the message rendering component;

at least two of the audio function and instruction messages have at least one word in common;

the memory stores a single instance of compressed audio data for the common word; and the CPU is adapted to decompress the single instance to generate the common word for each of the at least two audio function and instruction messages.

25. The invention of claim 10, wherein the user interface comprises the single function button and a single instruction button.

26. The invention of claim 10, wherein the user interface consists of the single function button and a single instruction button.

27. The invention of claim 10, wherein the function and instruction buttons are selectively operated to generate either a next function message, a previous function message, a next instruction message for a selected device function, or a previous instruction message for the selected device function.

28. An apparatus for providing instruction to a user to assist the user in operating a multi-function device, the apparatus having processing capability and memory, comprising:

(a) non-visual function messages describing to the user, functions that are supported by the multi-function device, the function messages being adapted to be stored in memory;

(b) non-visual instruction messages instructing the user how to operate the multi-function device, wherein the multi-function device performs at least one task associated with at least one of the functions, the instruction messages being adapted to be stored in memory;

(c) a toggle mechanism, comprising a single function button associated with the function messages and an instruction button associated with the instruction messages, the toggle mechanism configured to enable the user to quickly select a particular function message and an associated instruction message by toggling and/or holding the function and/or instruction buttons relative to each other, wherein:

the function button is operated to cause the message processor to generate function messages; and the instruction button is operated to cause the message processor to generate instruction messages for the device function corresponding to the most recently generated function message.

29. The invention of claim 28, wherein the function and instruction messages are audio messages.

30. The invention of claim 28, wherein:

(1) toggling the function button causes a next function message to be presented;

(2) toggling the instruction button causes a next instruction message for a selected device function to be presented;

(3) holding the instruction button and then toggling the function button cause a previous function message to be presented;

(4) holding the function button and then toggling the instruction button cause a previous instruction message for the selected device function to be presented; and (5) holding both the function and instruction buttons causes one or more trouble-shooting messages to be presented.

31. The invention of claim 28, wherein the function messages are adapted to be generated in a particular order selected based on prior user selections of the device functions.

32. The invention of claim 28, wherein:

at least two of the function and instruction messages have at least one word in common;

the memory stores a single instance of data for the common word; and the single instance is adapted to be processed to generate the common word for each of the at least two function and instruction messages.

33. The invention of claim 28, wherein the user interface comprises a single function button and a single instruction button.

34. The invention of claim 28, wherein the user interface consists of a single function button and a single instruction button.

35. The invention of claim 28, wherein the function and instruction buttons are selectively operated to generate either a next function message, a previous function message, a next instruction message for a selected device function, or a previous instruction message for the selected device function.

36. An apparatus for providing instructions to operate a device, wherein:

the apparatus is adapted to present one or more function messages identifying one or more device functions;

the apparatus is adapted to present one or more instruction messages for each of the device functions;

the function and instruction messages are non-visual messages; and the apparatus comprises:

(a) a user interface adapted to generate signals to control presentation of the function and instruction messages;

(b) a message processor adapted to generate the function and instruction messages based on the signals from the user interface; and (c) a message rendering component adapted to render the function and instruction messages;

the user interface comprises a function button and an instruction button;

the function button is operated to cause the message processor to generate function messages; and the instruction button is operated to cause the message processor to generate instruction messages for the device function corresponding to the function message most recently rendered by the message rendering component, wherein:

(1) operating the function button generates a first set of one or more signals that causes the message processor to generate a next function message;

(2) operating the instruction button generates a second set of one or more signals that causes the message processor to generate a next instruction message for a selected device function;

(3) operating first the instruction button and then the function button generates a third set of one or more signals that causes the message processor to generate a previous function message; and (4) operating first the function button and then the instruction button generates a fourth set of one or more signals that causes the message processor to generate a previous instruction message for the selected device function.

37. The invention of claim 36, wherein:
(5) simultaneously operating the function button and the instruction button generates a fifth set of one or more signals that causes the message processor to generate one or more trouble-shooting messages.

38. The invention of claim 36, wherein the message processor is adapted to generate the function messages in a particular order selected based on prior user selections of the device functions.

39. The invention of claim 36, wherein the message processor comprises:
(1) memory adapted to store data corresponding to the function and instruction messages; and
(2) a data processor adapted to process the stored data to generate the function and instruction messages, wherein:
at least two of the function and instruction messages have at least one word in common;
the memory stores a single instance of data for the common word; and
the data processor is adapted to process the single instance to generate the common word for each of the at least two function and instruction messages.

40. The invention of claim 36, wherein the function and instruction messages are audio messages.

41. An apparatus for providing instruction to a user to assist the user in operating a multi-function device, the apparatus having processing capability and memory, comprising:
(a) function messages describing to the user, functions that are supported by the multi-function device, the function messages being adapted to be stored in memory;
(b) instruction messages instructing the user how to operate the multi-function device, wherein the multi-function device performs at least one task associated with at least one of the functions, the instruction messages being adapted to be stored in memory; and
(c) a toggle mechanism, having a function button associated with the function messages and an instruction button associated with the instruction messages, the toggle mechanism configured to enable the user to quickly select a particular function message and an associated instruction message by toggling and/or holding the function and/or instruction buttons relative to each other, wherein:
the function button is operated to cause the message processor to generate function messages; and
the instruction button is operated to cause the message processor to generate instruction messages for the device function corresponding to the most recently generated function message, wherein:
(1) toggling the function button causes a next function message to be presented;
(2) toggling the instruction button causes a next instruction message for a selected device function to be presented;
(3) holding the instruction button and then toggling the function button cause a previous function message to be presented; and
(4) holding the function button and then toggling the instruction button cause a previous instruction message for the selected device function to be presented.

42. The invention of claim 41, wherein:
(5) holding both the function and instruction buttons causes one or more trouble-shooting messages to be presented.

43. The invention of claim 41, wherein the function and instruction messages are audio messages.

44. The invention of claim 41, wherein the function messages are adapted to be generated in a particular order selected based on prior user selections of the device functions.

45. The invention of claim 41, wherein:
at least two of the function and instruction messages have at least one word in common;
the memory stores a single instance of data for the common word; and
the single instance is adapted to be processed to generate the common word for each of the at least two function and instruction messages.

46. A processor for use in an apparatus that provides instructions to operate a multi-function device, the processor comprising:
(a) an input/output component adapted to receive signals from a user interface instructing the processor to generate function messages and instruction messages, each function message corresponding to a function of the multi-function device and each instruction message corresponding to an instruction step for one of the device functions;
(b) a data memory component adapted to store compressed data corresponding to the function and instruction messages; and
(c) a CPU adapted to decompress the compressed data to generate decompressed data corresponding to the function and instruction messages;
the user interface comprises a function button and an instruction button;
the function button is operated to cause the message processor to generate function messages; and
the instruction button is operated to cause the message processor to generate instruction messages for the device function corresponding to the function message most recently rendered by the message rendering component, wherein the signals received from the user interface comprise:
(1) a first set of one or more signals that causes the message processor to generate a next function message;
(2) a second set of one or more signals that causes the message processor to generate a next instruction message for a selected device function.
(3) a third set of one or more signals that causes the message processor to generate a previous function message; and
(4) a fourth set of one or more signals that causes the message processor to generate a previous instruction message for the selected device function, wherein:
the first set of signals is generated by toggling the function button of the user interface;
the second set of signals is generated by toggling the instruction button of the user interface;
the third set of signals is generated by holding the instruction button and then toggling the function button; and
the fourth set of signals is generated by holding the function button and then toggling the instruction button.

47. The invention of claim 46, wherein the signals received from the user interface further comprise:
(5) a fifth set of one or more signals that causes the message processor to generate one or more troubleshooting messages, wherein the fifth set of signals is generated by holding both the function and instruction buttons.

48. The invention of claim 46, wherein the function and instruction messages are audio messages.

49. The invention of claim 46, wherein the function messages are adapted to be generated in a particular order selected based on prior user selections of the device functions.

50. The invention of claim 46, wherein:

at least two of the function and instruction messages have at least one word in common;

the data memory component stores a single instance of data for the common word; and the single instance is adapted to be processed to generate the common word for each of the at least two function and instruction messages.

* * * * *